| United States Patent [19] | [11] | Patent Number: | 5,274,013 |
|---|---|---|---|
| Lieux | [45] | Date of Patent: | Dec. 28, 1993 |

[54] MOISTURE RESISTANT THERMOSET CABLE JACKET

[75] Inventor: Ralph L. Lieux, Baton Rouge, La.

[73] Assignee: The Dow Chemical Company, Midland, Mich.

[21] Appl. No.: 891,139

[22] Filed: Jun. 1, 1992

[51] Int. Cl.$^5$ ............................ C08K 3/20; C08K 5/10
[52] U.S. Cl. ..................................... 523/455; 525/387
[58] Field of Search ........................ 523/455; 525/387

[56] References Cited

U.S. PATENT DOCUMENTS

| 3,657,381 | 4/1972 | Speitel et al. | 523/455 |
| 4,251,648 | 2/1981 | Oetzel | 525/393 |
| 4,808,642 | 2/1989 | Kitada et al. | 523/455 |

Primary Examiner—Melvyn I. Marquis
Assistant Examiner—D. Aylward

[57] ABSTRACT

A curable, processable, substantially lead-free composition for moisture resistant cable jacket applications based on chlorinated polymeric materials stabilized by an epoxy compound.

15 Claims, No Drawings

MOISTURE RESISTANT THERMOSET CABLE JACKET

BACKGROUND OF THE INVENTION

This invention relates to a substantially lead-free composition useful as a moisture resistant cable jacket material. More particularly, this invention relates to lead-free chlorinated polyolefin polymer composition and their use as moisture resistant cable jacket materials.

Cable jacket materials are used in the wire and cable industry to protect primary insulation from damage that can be caused by abrasion, moisture, oils, and chemicals. Consequently, cable jackets themselves typically have to meet requirements of abrasion and moisture resistance as well as exhibiting high tensile strength, cut resistance and oil and chemical resistance. For these reasons, cable jackets are usually manufactured from curable polymeric materials including chlorinated polyethylene, chlorosulfonated polyethylene, chloroprene, ethylene propylene diene terpolymers and ethylene propylene materials. Examples of cable jacket formulations based on chlorosulfonated polyethylene, chloroprene, and EPDM hydrocarbon rubber are presented in, "Formulations for wire and cable applications" 82/01, Electrical Elastomers, DuPont Company, Polymer Products Dept., Elastomers Division, Wilmington, DE 19898.

Moisture resistance is required because water absorbed into the cable insulation provides a medium for the flow of electricity away from the conductor. This leakage of electricity reduces the insulation properties of the material which can result in electrical shock hazards. Traditionally, it is known to use lead salts such as lead oxide, dibasic lead phthalate, dibasic lead phosphite and lead mono- and distearates as heat stabilizers in cable jacket compositions containing chlorinated polymers where they also function as moisture retarders. However, with concern being expressed about the incompatibility of lead-containing materials in certain disposal techniques, there is a need to produce moisture resistant cable jackets that are substantially lead-free. The present invention fills this need while maintaining the necessary attributes of cable jacket materials.

SUMMARY OF THE INVENTION

It is the object of this invention to provide substantially lead-free compositions that are useful in the manufacture of moisture-resistant cable jacketing. It is another object of this invention to provide moisture-resistant, environmentally acceptable, cable jacketing. These and other objects are accomplished herein by providing a substantially lead-free composition comprising a curable, extrudable halogenated polymer, an epoxy compound, one or more fillers, one or more compatible plasticizers, means for cross-linking the halogenated polymer, and an accelerator for the cross linking agent. Other additives such as lubricants, pigments, process aids, antioxidants, antiozonants, other polymers, such as EPDM ternary copolymer, and additional stabilizers may also be utilized. Substantially lead-free, as used herein, is meant to indicate that no lead-containing materials are added to the composition.

DETAILED DESCRIPTION OF THE INVENTION

Substantially lead-free compositions that are useful in the manufacture of moisture-resistant cable jacketing are based on chlorinated polyolefin resins, particularly chlorinated polyethylene resins, (CPE), and preferably chlorinated polyethylene resins having a chlorine content of 25-45 percent. Most preferably, the chlorine content of such resins is in the range of 32-38 percent. Tyrin ® 566 chlorinated polyethylene, a 36% $Cl_2$ resin commercially available from The Dow Chemical Company, is an example of a most preferred CPE. Chlorinated polyethylene resins are readily crosslinked through the conventional means of peroxide/accelerator systems, sulfur bonding as provided by mereaptothiadiazole techniques, and electron beam curing.

In this invention it is preferred that the crosslinking method be that of peroxide curing with dicumyl peroxide, benzoyl peroxide, ditertiary butyl peroxide, bis-(dibutyl peroxy)valerate, bis-(tertiary butyl(peroxy) diisopropyl benzene, and 2,5-bis-(tertiary butylperoxy)-2-5-dimethyl hexane being advantageously employed. Most preferred is bis-(dibutyl peroxy) valerate. For safety and handling purposes, peroxides are usually supplied by the manufacturers absorbed into clay products at a given percentage of peroxide. For example, bis-(dibutyl peroxy) valerate is supplied as a 40% active peroxide absorbed on a kaolin material under the name Vulcup ® 40 KE from R. T. Vanderbilt, Inc. Several accelerators have been found useful in aiding the crosslinking process with triallyl eyanurate, triallyl isocyanurate, diallyl phthalate, polybutadiene, and acrylic esters being among the accelerators found to enhance the overall peroxide cure density. Of these, acrylic esters have been found to be especially useful, with alkyl acrylates being preferred and trimethylolpropane trimethaerylate such as Saret ® 517 brand available from Sartomer Corporation being most preferred.

This invention relates to compositions that include polymers containing chlorine. As such, it is necessary to protect the polymers against thermal degradation by dehydrochlorination both during high temperature processing and curing and subsequently during service at elevated operating temperatures in the range of about 100° C. (212° F.) to about 200° C. (392° F.) or higher, up to the temperature of deterioration of physical properties at about 220° C. (428° F.). Generally any commercially available heat stabilizer which will impart heat stability to the present invention during and after processing may be utilized. Epoxy compounds, including epoxidized vegetable oils, perform as acid acceptors in compositions containing chlorinated polymers. (Thermoplastic Polymer Additives, Theory and Practice, John T. Lutz, Jr., Editor; Marcel Dekker Inc., 270 Madison Avenue, New York, NY 10016, Copyright 1989.) Epoxy compounds such as a) glycidyl esters of carboxylic acids; b) glycidyl ethers; c) condensation products of epichlorohydrin with 2:2-bis(p-hydroxyphenyl) propane; and d) epoxy cycloaliphatic esters and ethers have been found particularly satisfactory. A preferred epoxy compound is selected from the group consisting of epoxidized soybean oil, epoxidized linseed oil, epoxidized tall oil, and epoxidized cottonseed oil. Preferred compositions include epoxidized soybean oil and epoxidized cottonseed oil.

Plasticizers are included in cable jacket polymeric compositions for several reasons. One is to maintain flexibility in the products formed from the compositions. This is especially true in polymeric compositions that contain fillers. Another is to aid processability of compositions being converted into finished products such as in crosshead die extrusion of cable jacketing materials over an insulated or uninsulated conductor. This again is especially true in compounds that contain fillers. Actual plasticizer selection for chlorinated polymer compositions depends on such factors as compatibility, processing requirements, cost, and desired physical properties of the cured chlorinated polyolefin materials. Aromatic compounds, while generally compatible with chlorinated polymers and inexpensive, can interfere with the free radical curing mechanism of peroxide initiators and are generally not used. Ester plasticizers, particularly the phthalate esters, offer a good balance of compatibility, performance, and cost while the polymeric liquid plasticizers exhibit outstanding heat resistance but are expensive. Diisononyl phthalate is a preferred plasticizer for cable jacket compositions utilizing chlorinated polymers.

Fillers are commonly used in cable jacketing compositions to afford physical property enhancements such as abrasion resistance. Fillers can also positively affect the economics of the present compositions and negatively affect processability. Preferred compositions also include one or more plasticizers to counteract the negative effect and regain processability. Fillers used in polymeric systems are typically chosen from clays which contain mostly aluminum silicate; tales which are predominantly magnesium silicate; carbonates such as calcium carbonate; and various types of carbon blacks. Clay products, typically used in moisture resistant cable jackets, are preferably treated with or contain amino silanes to prevent or reduce moisture absorption by the clay. Unless requirements, such as a colored cable jacket, preclude the use of carbon black, then the most preferred embodiment would include carbon black for its beneficial role in moisture resistance in chlorinated polyethylene compositions.

Plasticizers, as mentioned, are used to retain processability in filled polymeric systems. Aliphatic systems are preferred as aromatic oils can interfere with the peroxide/accelerator crosslinking mechanism. Materials such as diisononyl phthalate have been found to be quite acceptable. Chlorinated paraffins may also be advantageously used.

Other polymeric materials such as for example, hydrocarbon rubber, such as, EPSYN brand ethylene propylene diene monomer (EPDM) rubber or the ternary copolymer made therefrom manufactured by the Copolymer Corporation may be used in cable jacket applications as partial replacement for other polymers, providing that oil and chemical resistance are not required.

A composition of this invention suitable for conversion into a cable jacket material is prepared by mixing the various components in an internal mixer, such as a Banbury ® mixer, available from Farrell Corp. Ansonia, Connecticut. In one embodiment, all the materials are charged to the mixer which is operated at low rotor speed with full cooling. At a pre-determined stock temperature, the mixed ingredients are discharged from the internal mixer to a cooled two roll mill where the mix is processed into a sheet-form slabstock. The mixing temperature is kept below the decomposition temperature of the cross-linking agent. Strainer extruders are also employed to receive material discharged from the internal mixer.

In another embodiment, the mixing takes place in what is termed an, "upside down" procedure. Here all of the dry ingredients, with the exception of the polymers, are charged to an internal mixer, such as a Banbury ® mixer, operating at low rotor speed under full cooling. Then all liquid materials are added, followed by the polymers. The ram of the Banbury ® mixer is lowered to initiate the mixing process. Typically a 75% full volume is targeted. At a stock temperature of 70°-75° C. (160°-170° F.), the ram is raised to clear the mixer and any materials that may not have fully entered the mixing chamber are now swept into the chamber. The ram is once again lowered and mixing is continued until a melt temperature of 990-110° C. (210°-230° F.) is attained. The mix is then discharged onto a cold two roll mill where it is cooled and converted into a slabstock form. The slabstock is then removed from the two roll mill in sheet-form. Cross-linking can be accomplished by heating the slabstock under pressure for 2 minutes at 205° C. (400° F.).

In the preferred embodiment, using the "upside down" method, with all ingredients listed as parts per one hundred parts of chlorinated polyethylene, 30 parts of TRANSLINK 37 brand of treated aluminum silicate manufactured by Engelhard Industries, 5 parts of VULCUP 40 KE brand of bis-(dibutyl peroxy) valerate supplied as a 40% loading on an electrical grade kaolin clay by R. T. Vanderbilt Inc., 5 parts of SARET 517 brand methacrylate resin cure accelerator supplied by Sartomer Corp., and 6 parts of HA85 brand of antimony oxide supplied by Wyrough and Loser were charged to a Banbury ® mixer operating with full cooling and a rotor speed of 24 RPM. Then 15 parts of diisononyl phthalate manufactured by Exxon Chemical Company and 5 parts of DRAPEX 6.8 brand of epoxidized soybean oil manufactured by the Argus Chemical Division of Witco Corp. were added. Lastly, 100 parts of TYRIN 566 brand of chlorinated polyethylene containing 36% chlorine, manufactured by The Dow Chemical Company were then added. Mixing was continued until a stock temperature of 165° F. was reached at which time the ram of the Banbury ® mixer was raised, and any remaining materials in the chute of the Banbury ® were swept into the mixing chamber. The ram was then lowered and the mixing was continued until a stock temperature of 220° F. was attained. The mixed material was then dropped from the Banbury ® mixer and transferred to a cooled two roll mill where it was cooled and subsequently removed in sheet form. The sheeted material can then be crosslinked by heating under pressure at a temperature of 204° C. (400° F.).

Compositions as described above can be extruded onto a wire conductor thereby forming an insulating cover, or can be extruded over such an insulated conductor thereby forming a jacket for the insulated conductor. Extruders typically used in the wire and cable industry are low compression single screw extruders having a compression ratio of 2.0 or below. Crosshead coating dies are conventionally used to coat the conductor or insulated conductor.

The following examples illustrate the invention without necessarily limiting its scope. The compositions were prepared by mixing in an "upside down" manner in a 1600 cc Banbury ® mixer to a drop temperature of 105° C. (220° F.) .Moisture absorption testing was performed as per ASTM D470 on slabs that had been cured for 2 minutes at 204° C. (400° F.). Moisture absorption testing was carried out for 7 days at 70° C. (158° F.) with any weight increase of the sample noted. Wire and Cable Industry Specifications, for example Underwriter's Laboratories UL44, consider a weight gain of 15.0 mg/in$^2$ (15 mg/6.45 cm$^2$) to be the maximum allowable for high voltage control cable. The results are tabulated in Tables I and II below herein.

For comparison, a formulation containing 40 phr of T(HRL)D90 brand of lead oxide was evaluated in comparative Example 1. 7 phr of T(HRL)D90 were evaluated in comparative examples 2, 3, 12, 13 and 14 on the same basis as the examples of the invention, Examples 4, 5, 6, 7, 8, 9, 10, 11, 15, 16, 17 and 18.

TABLE I

| | EXAMPLES AND TESTING EXAMPLES 1-6 | | | | | | |
|---|---|---|---|---|---|---|---|
| | 1 | 2 | 3 | 4 | 5 | 6 | |
| CPE | 100 | 100 | 70 | 70 | 70 | 70 | Tyrin ® 566 |
| EPDM | — | — | 30 | 30 | 30 | 30 | Epsyn 70A |
| Lead | 40 | 7 | 7 | — | — | — | T(HRL)D 90 |
| Epoxy | — | — | — | 5 | 5 | 5 | Drapex 6.8 |
| Filler | 60 | 60 | 60 | 60 | 60 | 60 | MV Talc |
| Plasticizer | 20 | 20 | — | — | — | 10 | DINP |
| Peroxide | 5 | 5 | 5 | 5 | 5 | 5 | Vulcup 40KE |
| Accelerator | 5 | 5 | 5 | 5 | 5 | 5 | Saret 517 |
| Antioxidant | — | — | — | — | 0.2 | 0.2 | Agerite D |
| Press Moisture Absorption | 7.6 | 24.3 | 14.8 | 13.7 | 12.6 | 12.9 | |

The lead-free compositions (Examples 4, 5 and 6) met the Wire and Cable Industry Specifications as per UL 44 and ASTM D470. Comparative Example 1 and 3 meet the Wire and Cable Industry Specifications for moisture resistance; however, these formulations, Examples 1 and 3, contain added lead stabilizer salts and are not as environmentally acceptable.

TABLE II

| | EXAMPLES AND TESTING EXAMPLES 7-14 | | | | | | | | |
|---|---|---|---|---|---|---|---|---|---|
| | 7 | 8 | 9 | 10 | 11 | 12 | 13 | 14 | |
| CPE | 70 | 70 | 80 | 80 | 80 | 80 | 90 | 90 | Tyrin ® 566 |
| EPDM | 30 | 30 | 20 | 20 | 20 | 20 | 10 | 10 | Epsyn 70A |
| Lead | — | — | — | — | — | 7 | 7 | 7 | T(HRL)D 90 |
| Epoxy | 5 | 5 | 5 | 5 | 5 | — | — | — | Drapex 6.8 |
| Filler (a) | 30 | 60 | 60 | 60 | 60 | 60 | 60 | — | MV Talc |
| Plasticizer | 15 | 10 | 15 | 15 | 25 | 15 | 20 | 20 | DINP |
| Peroxide | 5 | 5 | 5 | 5 | 5 | 5 | 5 | 5 | Vulcup 40KE |
| Accelerator | 5 | 5 | 5 | 5 | 5 | 5 | 5 | 5 | Saret 517 |
| Antioxidant | — | 1.5 | — | 1.5 | 1.5 | 1.5 | 1.5 | 1.5 | Irganox 1035 |
| Filler (b) | 30 | — | — | — | — | — | — | 60 | Translink 37 |
| Moisture Absorption | 10.1 | 12.7 | 14.1 | 13.0 | 10.4 | 15.3 | 16.7 | 12.3 | |

The incorporation of EPDM, in Example 7-11, as partial replacement for chlorinated polyethylene in an epoxy stabilized system also results in acceptable moisture absorption values without the use of lead salts, as per UL 44 and ASTM D470.

TABLE III

| | EXAMPLES AND TESTING EXAMPLES 15-18 | | | | |
|---|---|---|---|---|---|
| | 15 | 16 | 17 | 18 | |
| CPE | 100 | 100 | 100 | 100 | Tyrin ® 566 |
| Epoxy | 5 | 5 | 5 | 5 | Drapex 6.8 |
| Filler a) | 25 | 25 | — | — | Black N550 |
| Filler b) | — | — | 60 | 60 | Translink 37 |
| Plasticizer | 15 | 15 | 10 | 10 | DINP |
| Peroxide | 5 | 5 | 5 | 5 | Vulcup 40KE |
| Accelerator | 5 | 5 | 8 | 8 | Saret 517 |
| Antioxidant | — | — | 1.5 | 1.5 | Irganox 1035 |
| Filler c) | 6 | 6 | — | — | Sb$_2$O$_3$ |
| Moisture Absorption | 12.0 | 11.3 | 12.7 | 11.3 | |

These examples met the requirements of moisture absorption resistance as per UL 44 AND ASTM D470.

| Component | | Manufacturer/Supplier |
|---|---|---|
| Tyrin ® 566 | Chlorinated polyethylene | The Dow Chemical Company |
| Epsyn ® 70A | Ethylene propylene diene monomer | Copolymer Rubber |
| T(HRL)D 90 | 90% lead oxide on a polymeric carrier | Wyrough and Loser |
| Drapex ® 6.8 | Epoxidized soybean oil | Argus Chemical |
| MV Talc | Magnesium silicate | Cypress Minerals |
| DINP | Diisononyl phthalate | Exxon Corp. |
| Vulcup ® 40KE | 40% bis-(dibutylperoxy) valerate on Kaolin clay | R. T. Vanderbilt |
| Saret ® 517 | Trimethylolpropane trimethacrylate | Sartomer Corp. |
| Agerite ® D | Polymerized trimethyl-dihydroquinoline | R. T. Vanderbilt |
| Black N440 | Furnace carbon black | Cabot Corp. |
| Irganox ® 1035 | Hindered phenol | Ciba-Geigy |
| Translink ® 37 | Treated aluminum | Engelhard Industries |
| Sb$_2$O$_3$ | Antimony oxide | Wyrough and Loser |

What is claimed is:

1. A curable, processable, substantially lead-free blend composition for moisture resistant cable jacket applications consisting essentially of:
   a.) a chlorinated polyolefin polymer;
   b.) an epoxy compound;
   c.) a filler;
   d.) a plasticizer; and
   e.) a crosslinker for crosslinking said polymer.

2. The composition of claim 1 wherein said polymer is chlorinated polyethylene.

3. The composition of claim 2 wherein the chlorine content of said chlorinated polyethylene is from about 25 to about 45 percent.

4. The composition of claim 3 wherein said chlorine content of said chlorinated polyethylene is from about 32 to about 38 percent.

5. The composition of claim 1 wherein said epoxy compound is selected from the group consisting of a glycidyl group, a glycidyl ether group, an epoxy group in a carbocyclic ring, and mixtures thereof.

6. The composition of claim 1 wherein said epoxy compound is selected from a group consisting of epoxidized soy bean oil, epoxidized linseed oil, epoxidized tall oil, and epoxidized cottonseed oil.

7. The composition of claim 6 wherein said epoxy compound is epoxidized soybean oil.

8. The composition of claim 1 wherein said filler is selected from a group consisting of aluminum silicate, magnesium silicate, and carbon black.

9. The composition of claim 8 wherein said filler is aluminum silicate.

10. The composition of claim 1 wherein said plasticizer is selected from a group consisting of ester plasticizers, chlorinated paraffin plasticizers, and epoxidized vegetable oil plasticizers.

11. The composition of claim 10 wherein said plasticizer is an ester plasticizer.

12. The composition of claim 11 wherein said ester plasticizer is diisononyl phthalate.

13. The composition of claim 1 wherein said crosslinker comprises a peroxide and an accelerator wherein said peroxide is selected from a group consisting of dicumyl peroxide, benzoyl peroxide, ditertiary butyl peroxide, bis-(dibutyl peroxy) valerate, bis-(tertiary butyl peroxy) diisopropyl benzene, and 2-5-bis-(tertiary butyl peroxy)-2-5dimethyl hexane and said accelerator is selected from a group consisting of polybutadiene triallyl eyanurate, triallyl isocyanurate, diallyl phthalate, and an acrylic ester.

14. The composition of claim 13 wherein said peroxide is bis-(dibutyl peroxy) valerate.

15. The composition of claim 14 wherein said accelerator is an acrylic ester.

* * * * *

UNITED STATES PATENT AND TRADEMARK OFFICE
CERTIFICATE OF CORRECTION

PATENT NO. : 5,274,013

DATED : December 28, 1993

INVENTOR(S) : Ralph L. Lieux

It is certified that error appears in the above-identified patent and that said Letters Patent is hereby corrected as shown below:

Column 6, Claim 5, line 67, insert -- ether -- between "glycidyl" and "group"; "a glycidyl ether group" should read -- a glycidyl ester group --;

Column 8, Claim 13, line 9, "peroxy)-2-5dimethyl" should read -- peroxy)-2-5 dimethyl --; line 11, "eyanurate" should read -- cyanurate --.

Signed and Sealed this

Nineteenth Day of July, 1994

Attest:

BRUCE LEHMAN

Attesting Officer      Commissioner of Patents and Trademarks